Aug. 11, 1931.  W. SNEE ET AL  1,818,588
AEROPLANE
Filed Sept. 27, 1929
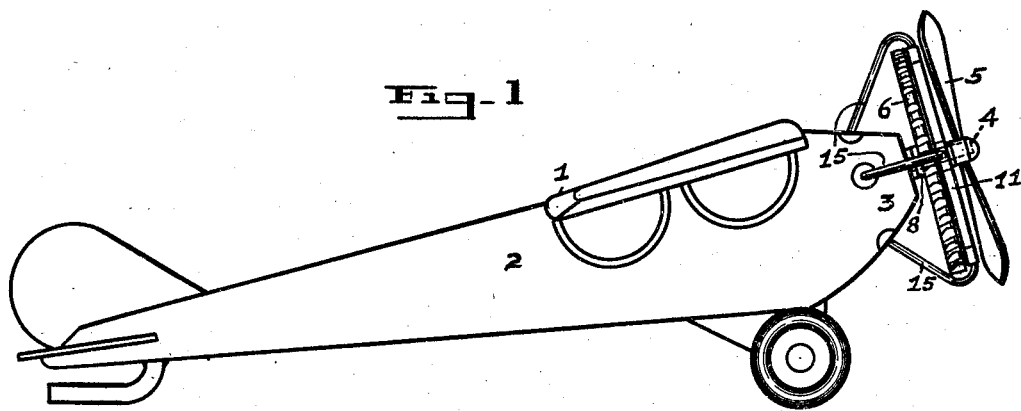
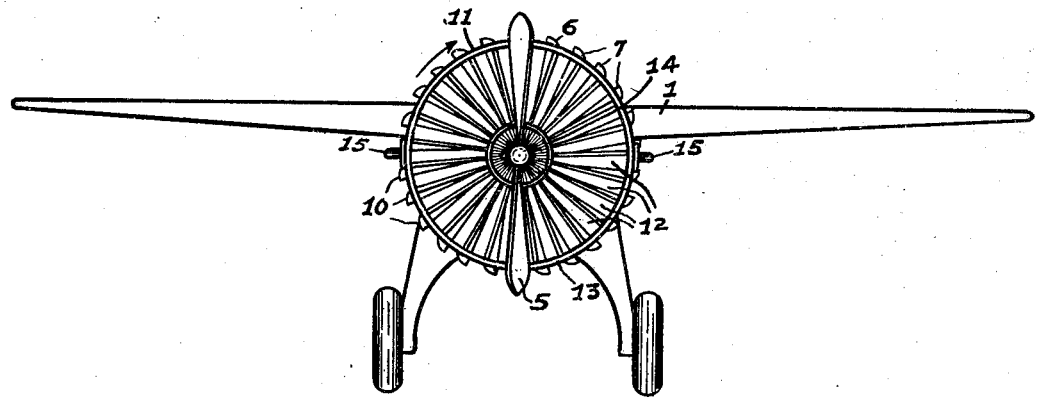
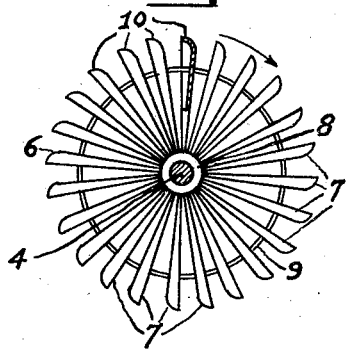
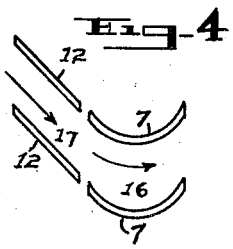
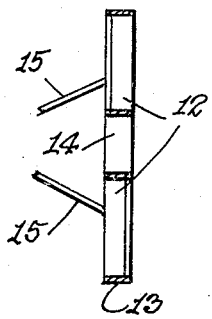
INVENTORS
William Snee
Morris Bell
By Jas R Snyder
Attorney Patented Aug. 11, 1931

1,818,588

UNITED STATES PATENT OFFICE

WILLIAM SNEE AND MORRIS BELL, OF WEST ELIZABETH, PENNSYLVANIA

AEROPLANE

Application filed September 27, 1929. Serial No. 395,494.

Our invention relates broadly to certain new and useful improvements in aeroplanes, but more particularly to a wind operated auxiliary power apparatus for assisting in propelling an aeroplane.

The primary objects of the invention are to provide a wind operated auxiliary power apparatus of the character described, which will function in conjunction with the usual fuel operated power mechanism for propelling an aeroplane, thereby reducing the cost of operating an aeroplane by providing additional power without the use of additional fuel.

Further objects of the invention are to provide a device of the class stated which is simple in its construction and arrangement, strong, durable and efficient in its use, which may be readily installed in any type of aeroplane already constructed as well as form a component part of a new structure, and which is comparatively inexpensive to manufacture, install and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a side view of an aeroplane embodying the present invention.

Figure 2 is a front end view thereof.

Figure 3 is a front view of the wind rotor, partly in cross section.

Figure 4 is an enlarged diagrammatic plan view illustrating the relative positions of the directing and driving blades.

Fig. 5 is a diametrical, cross sectional view of the concentrator.

Referring in detail to the drawings 1 denotes a monoplane type of aeroplane including the fuselage 2 and nose 3. The engine, (not shown) is housed in the nose 3 of the fuselage 2 and includes an engine shaft 4, which projects forwardly from the nose 3 and carries the fixed propeller 5, at the outer end thereof. The construction of the aeroplane 1 differs from the usual construction only in that the engine shaft 4 is elongated to space the propeller 5 some distance from the nose 3.

The present invention comprises a wind rotor 6 which consists of a plurality of regularly arranged and spaced driving blades 7, which have their inner ends fixed to a hub 8. The driving blades 7 are radially aligned with the axial center of the hub 8 and are braced by an annulus 9, which passes through the transverse centers of the driving blades 7 adjacent to the outer ends thereof.

Each of the driving blades 7 is concavo-convex in transverse cross section, as clearly shown in Figures 3 and 4, and is provided with a rearwardly disposed cap 10 at the outer end thereof.

The wind rotor 6 is fixed on and rotates with the engine shaft 4, which extends through the hub 8. The wind rotor 6 is positioned in close proximity to the forward end of the nose 3 but is spaced from the propeller 5.

A circularly shaped, stationary, wind concentrator 11 surrounds the engine shaft 4 and is disposed between the propeller 5 and the wind rotor 6 directly in front of and in close proximity to the latter. The concentrator 11 comprises a plurality of radially disposed wind directing blades 12, which are regularly spaced from each other. The directing blades 12 are fixed in position to and between an outer rim 13 and an inner rim 14, as clearly shown in Figure 2. The wind concentrator 11 is carried by a plurality of supporting arms 15, which are fixed to the nose 3 and connect with the outer rim 13.

The concave sides of the driving blades 7 are disposed rearwardly, and the associated caps 10, likewise extend rearwardly. The spaced relation of adjacent driving blades 7 provides an air channel 16 therebetween, as clearly illustrated in Figure 4.

The angular edgewise disposition of the directing blades 12 is such that the front edges are disposed rearwardly of the rear edges thereof, thereby providing forwardly directed air channels 17 between adjacent directing blades 12, as clearly shown in Figure 4.

The terms "rearwardly" and "forwardly" as herein applied in describing the construction and operation of the concentrator 11 and wind rotor 6, is made relatively to the direction of rotation of the latter and of the propeller 5.

A great portion of the wind created by the travelling speed of the aeroplane 1 and by the rotation of the propeller 5 must pass through the concentrator 11, and will be directed by the latter against the concaved sides of the driving blades 7, whereby the rotor 6 will be rotated to assist in driving the propeller 5 and consequently diminish the toil of the aeroplane engine to a corresponding degree.

While the wind rotor 6 is preferably permanently fixed on the engine shaft 4 as herein illustrated and described, it will be obvious that a clutch mechanism may be provided whereby the wind rotor 6 can be released from or connected to the engine shaft 4, as desired.

Further, it is evident that a plurality of our wind power devices could be successfully employed by attaching the same to separate propellers, which together with the former need not be connected with the engine shaft, but would be positioned and secured at any suitable location on the aeroplane to assist in the propulsion of the latter.

The present invention provides a most efficient auxiliary power element for aeroplanes rendering the operation comparatively economical.

What we claim is:

1. In an aeroplane including an engine shaft, a propeller fixed to the forward end of the engine shaft, a wind rotor mounted on the engine shaft and disposed rearwardly of said propeller, and a concentrator for directing air currents to said wind rotor to rotate the latter in a direction assisting in driving said propeller.

2. In an aeroplane including an engine shaft, a propeller fixed to the forward end of the latter, a wind rotor fixedly mounted on the engine shaft and disposed rearwardly of said propeller, and a stationary concentrator for directing air currents to said wind rotor to rotate the latter in a direction assisting in driving said propeller.

3. In an aeroplane including an engine shaft, a propeller fixed to the forward end of the latter, a wind rotor fixedly mounted on the engine shaft and disposed rearwardly of said propeller, and a stationary concentrator for directing the air currents to said wind rotor to rotate the latter in a direction assisting in driving said propeller, said concentrator being disposed intermediate of said propeller and said wind rotor.

In testimony whereof we affix our signatures.

WILLIAM SNEE.
MORRIS BELL.